No. 895,202. PATENTED AUG. 4, 1908.
D. E. ROSS.
COMPENSATING GEARING.
APPLICATION FILED OCT. 27, 1906.

Witnesses
J. Starting
Brennan Bent

Inventor,
David E. Ross.
by Bates, Fouts & Hull
Attorneys.

UNITED STATES PATENT OFFICE.

DAVID E. ROSS, OF BROOKSTON, INDIANA, ASSIGNOR TO ROSS GEAR AND TOOL COMPANY, OF LA FAYETTE, INDIANA, A CORPORATION OF INDIANA.

COMPENSATING GEARING.

No. 895,202.  Specification of Letters Patent.  Patented Aug. 4, 1908.

Application filed October 27, 1906. Serial No. 340,808.

*To all whom it may concern:*

Be it known that I, DAVID E. ROSS, a citizen of the United States, residing at Brookston, in the county of White and State of Indiana, have invented a certain new and useful Improvement in Compensating Gearing, of which the following is a full, clear, and exact description, reference being had to the accompanying drawings.

This invention relates to compensating gearing that is employed between two members that are driven from the same source of power, said compensating mechanism permitting one of said members to turn at a different rate of speed from the other member.

The invention has for its object the provision of means on said compensating gearing for placing resistance in said gearing, whereby more power may be transmitted to the driven member that is meeting with the greater resistance or that is being the more slowly driven.

My invention is shown as applied to that form of compensating gearing which is illustrated, described and claimed in my pending application No. 257,255, although the same may be applied to any other suitable form of compensating mechanism.

Figure 2:
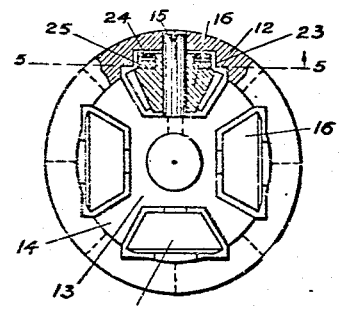
Figure 3:
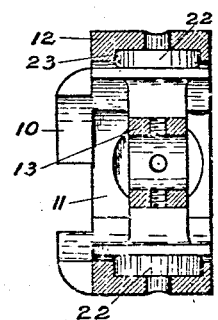
Figure 1:
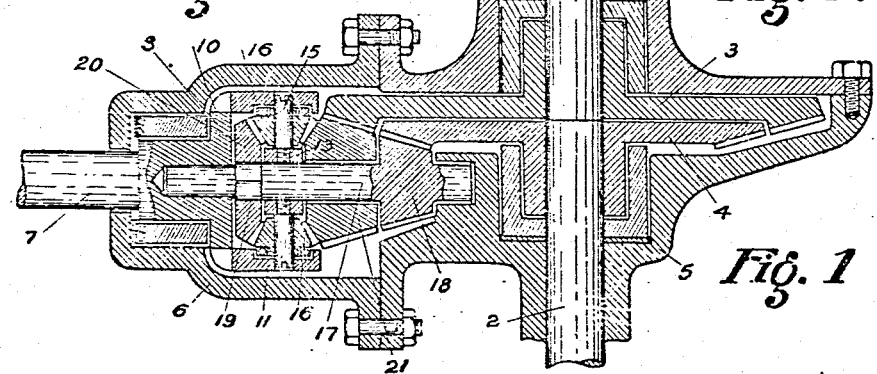
Figure 4:
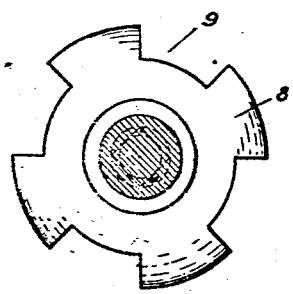
Figure 5:
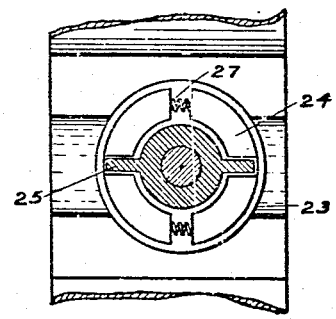
Figure 6:
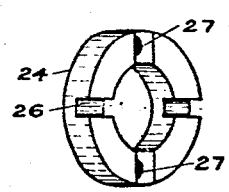

Referring to the drawing forming a part of this application, Figure 1 is a transverse sectional view taken through the center of my compensating gearing, parts thereof being shown in elevation; Fig. 2 is a side elevation of the frame or spider carrying the compensating gears, parts of the same being shown in section for clearness of illustration; Fig. 3 is a section taken vertically through the center of Fig. 2, the compensating gears and pinion shafts being removed; Fig. 4 represents a sectional elevation of the rear end of the power or driving shaft; Fig. 5 is a sectional elevation taken substantially on the line 5—5 of Fig. 2 looking in the direction of the arrow, and Fig. 6 is a perspective view of one pair of the divided disks that form brakes for the compensating gears.

Although my invention is especially adapted for connecting the driving gears on the rear axle sections of automobiles, it may be used in other relations, and I do not wish to be limited to the above stated use.

In turning corners with automobiles, the axle section that is connected with the outer wheel must necessarily rotate at a higher rate of speed than the remaining axle section. The compensating gears shown in my said application are entirely suitable for permitting this difference in rotation due to this cause. It sometimes happens however, that one of the wheels of the automobile will strike a slippery place in the road while the other rear wheel will be upon solid ground. In that case, the wheel that is upon the slippery place is liable to "race", or to have all the motion transmitted to it, the wheel that is standing upon solid ground remaining stationary. In such case, it is difficult to acquire sufficient traction to propel the machine, as the one wheel will simply turn upon the slippery part of the road without moving the vehicle. I have, therefore, devised a means for automatically applying resistance to the compensating gears, which will result in applying greater torque or tractive force to the wheel that is upon solid ground.

Referring to the drawing for a fuller description of my invention, 1 and 2 represent the rear axle sections of an automobile, said axle sections being provided on their respective inner ends, with beveled gears 3 and 4. The said gears are inclosed within a gear casing 5, to the front portion of which is detachably secured a casing 6 for the compensating gears. Projecting through this casing from the front is the power or driving shaft 7, said shaft terminating at its rear end in a disk 8, as is shown in Fig. 4.

The outer rim of the disk 8 is provided with equidistant recesses 9, that are adapted to receive projecting lugs 10 on the spider frame 11, said frame being shown in Fig. 3 of the drawing. This spider frame is provided with an outer annular portion 12 and an inner hub portion 13; said portions being rigidly secured together by radial arms 14. The portions 12 and 13 form supports for the journal pins 15, of the compensating gears or pinions 16, said pins extending through the annular portion 12 and screwing into the hub portion 13. By interlocking the shaft 7 with the spider frame 11, by means of the lugs 10 and the recesses 9, the spider frame is driven with the power shaft 7.

Journaled within the rear end of the drive shaft 7 and within the forward part of the casing 5, is a stub shaft 17, said shaft having at its rear end a beveled pinion 18, which meshes with the beveled gear 4 upon the axle section 2. The stub shaft has, near its front end a squared portion 19, upon which is mounted a beveled gear 20, said gear driving the stub shaft and, through it, the gears 18 and 4. Loosely mounted upon the stub shaft is a beveled pinion 21, said pinion meshing with and driving the beveled gear 3 upon the axle section 1. The beveled pinions 20 and 21 are connected by the orbital or compensating gears 16.

It being understood that the spider frame 11 and the compensating gears turn with the drive shaft, if said gears are prevented from rotating, motion will be transmitted equally to the two axle sections, which will be driven together in the same direction. If the vehicle is turning a corner, however, so that one of the gears 3 or 4 will turn faster than the other, said difference in rotation is compensated for by the gears 16, which will rotate upon their journal pins. Likewise, if one of the vehicle wheels strikes a slippery place in the road, said wheel will turn more easily than the other wheel, the result being that the motion of the driving shaft will be transmitted mostly to the wheel that is on the slippery place, the compensating gearing rotating rapidly about their journal pins. If, now, means are provided to check or resist the rotation of the compensating gears, greater force will be transmitted to the gear that is not upon the slippery part of the road, the result being that sufficient traction will be provided to carry the vehicle past the said slippery place. This is the real object of my invention, and said object I attain by the construction which is shown more particularly in Figs. 5 and 6 of the drawing.

Within the inner face of the annular portion 12 of the spider frame, I provide seats or recesses 22 opposite the orbital gears 16, said seats forming, on their peripheral edges 23, frictional surfaces with which engage the outer edges of the divided disks 24. These disks are carried upon hublike extensions of the beveled gears 16, said gears having projecting lugs 25 that extend into recesses 26 on the lower face of said divided disks, said lugs forming guide ways for the disks, and compelling the disks to turn with the gears. As shown, the disks 24 are divided into halves, said halves being normally drawn out of frictional engagement with the edges 23 of the recesses 22 by springs 27, said springs connecting the halves of the disks. If preferred, the disks may be divided into a greater number of parts so connected together.

From this description, it will be understood that, when one of the vehicle wheels begins to "race" or to turn with a much greater speed than the other wheel, the compensating gears will be caused to rotate rapidly upon their journal pins. The rotation of these gears causes a like rotation of the divided disks, with the result that said disks will be thrown apart by centrifugal action, thus carrying their outer edges into frictional engagement with the edges 23 of the recesses in the spider frame. The more rapid the rotation of the compensating gears, the greater will be the frictional resistance caused by the brake disks, so that, as the speed of one of the vehicle wheels increases over the speed of the other wheel, the brake disks will cause a correspondingly increasing part of the tractive force to be transmitted to the wheel having the slower rotation. If, therefore, one of the wheels strikes a slippery place in the road and "races" with respect to the other wheel, the brake disks will be thrown into frictional engagement with the spider frame, thereby checking the rotation of the compensating gears and throwing more torque upon the wheel that is upon solid ground, which is necessary in order to propel the vehicle.

While I have shown and described one form of compensating gear and one form of brake therefor, I desire it to be understood that the following claims are not intended to be limited thereto any further than is made necessary by their express terms or by the prior state of the art.

Having thus described my invention, I claim:

1. In a device of the character described, a plurality of members, means common to said members for furnishing power for driving the same, means connecting said members whereby they may be driven at different speeds and devices for automatically increasing the driving torque of one of said members as the difference in their speeds increases.

2. In a device of the character described, a pair of driven members, means common to said members for furnishing power for driving the same, compensating gearing connecting said members whereby they may be driven at different speeds and means connected with said compensating gearing for automatically causing an increase of driving torque on the member having the slower speed.

3. In a device of the character described, a pair of driven members, a drive shaft, connections between said drive shaft and said driven members, said connections containing rotatable compensating gears whereby the members may be driven at different rates of speed and braking devices carried by said compensating gears for automatically resisting the rotation of the latter, whereby greater torque may be applied to the driven member having the slower speed.

4. In a device of the character described, a pair of driven members, a drive shaft for said members, connections between said drive shaft and said members, said connections containing a plurality of rotatable orbital gears and braking devices carried by each of said orbital gears, said braking devices being adapted to automatically resist the rotation of said gears and thereby increase the torque of the more slowly driven member.

5. In a vehicle, a pair of axle sections, a drive shaft for said axle sections, compensating gears mounted to revolve with said drive shaft, driving gears connecting said compensating gears and the axle sections, the construction being such that when said axle sections are turning at different speeds the compensating gears will be rotated and means for automatically resisting the rotation of said compensating gears whereby the torque of the more slowly driven axle section will be increased and the speeds of said axle sections will be more nearly equalized.

6. In a vehicle, a pair of axle sections, a drive shaft for said axle sections, compensating gearing mounted to revolve with said drive shaft, driving gears connecting said compensating gears and the axle sections, the construction being such that when said axle sections are driven at different speeds the compensating gears will be rotated and means rotating with said compensating gears and automatically resisting the rotation thereof, whereby the torque of the more slowly driven axle section will be increased and the speeds of said axle sections will be more nearly equalized.

7. In a device of the character described, a pair of driven members, a drive shaft, orbital gears connected with said drive shaft so as to revolve therewith, connections between said orbital gears and the driven members, said orbital gears being adapted to compensate for different speeds of said driven members and to rotate on their axes whenever there is a difference in speed of said members, brakes carried by said orbital gears, said brakes being inoperative when said members are driven at substantially the same speed but becoming operative whenever the orbital gears rotate at a rapid speed, whereby the rotation of said orbital gears is resisted and the torque upon the more slowly driven member is increased.

8. In a device of the character described, a pair of driven members, a drive shaft, orbital gears connected with said drive shaft so as to revolve therewith, connections between said orbital gears and the driven members, said orbital gears being adapted to compensate for different speeds of said driven members and to rotate on their axes whenever there is a difference in speed of said members, centrifugal brakes carried by said orbital gears, said brakes being inoperative when said members are driven at substantially the same speed but becoming operative whenever the orbital gears rotate at a rapid speed, whereby the rotation of said orbital gears is resisted and the torque upon the more slowly driven member is increased.

9. In a vehicle, a pair of axle sections, beveled gears carried by said axle sections, a drive shaft, beveled pinions for driving said beveled gears, compensating gears connecting said beveled pinions, said compensating gears revolving in an orbit with the drive shaft and being adapted to rotate upon their axes whenever the axle sections turn at different speeds and means for automatically preventing an excess in speed of rotation of said compensating gears, whereby greater torque is thrown upon the more slowly driven axle section.

10. In a vehicle, a pair of axle sections, beveled gears carried by said axle sections, a drive shaft, beveled pinions for driving said beveled gears, compensating gears connecting said beveled pinions, said compensating gears revolving in an orbit with the drive shaft and being adapted to rotate upon their axes whenever the axle sections turn at different speeds and braking devices carried by said orbital gears for automatically preventing an excess in speed of rotation thereof, whereby greater torque is thrown upon the more slowly driven axle section.

11. In a vehicle, a pair of axle sections, a drive shaft, a frame connected with said drive shaft so as to rotate therewith, a plurality of orbital gears carried by said frame, connections between said orbital gears and the axle sections, the construction being such that when the axle sections are driven at different speeds, the orbital gears will rotate on their axes, a pair of divided disks carried by each of said orbital gears, there being braking surfaces within the said frame with which said divided disks are adapted to engage whenever said orbital gears rotate at an excessive speed and means for normally holding said disks out of engagement with said braking surfaces.

12. In a vehicle, a pair of axle sections, a drive shaft, a frame connected with said drive shaft so as to rotate therewith, a plurality of orbital gears carried by said frame, said gears having hub extensions and lugs, connections between said orbital gears and the axle sections, the construction being such that when the axle sections are driven at different speeds, the orbital gears will rotate on their axes, a pair of divided disks carried by the hub extension of each of said orbital gears and sliding on the said lugs, there being braking surfaces within the said frame with which said divided disks are adapted to engage whenever said orbital gears rotate at an excessive speed and springs for normally holding said disks out of engagement with said braking surfaces.

In testimony whereof, I hereunto affix my signature in the presence of two witnesses.

DAVID E. ROSS.

Witnesses:
GEO. J. KERNS,
LYNN H. BORDNER.